C. H. LAMBKIN.
HOSE COUPLING.
APPLICATION FILED NOV. 27, 1914.
1,181,676.
Patented May 2, 1916.
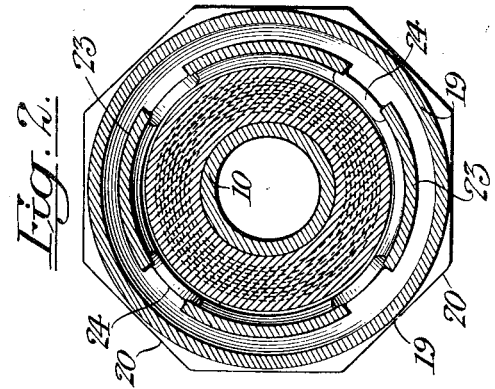
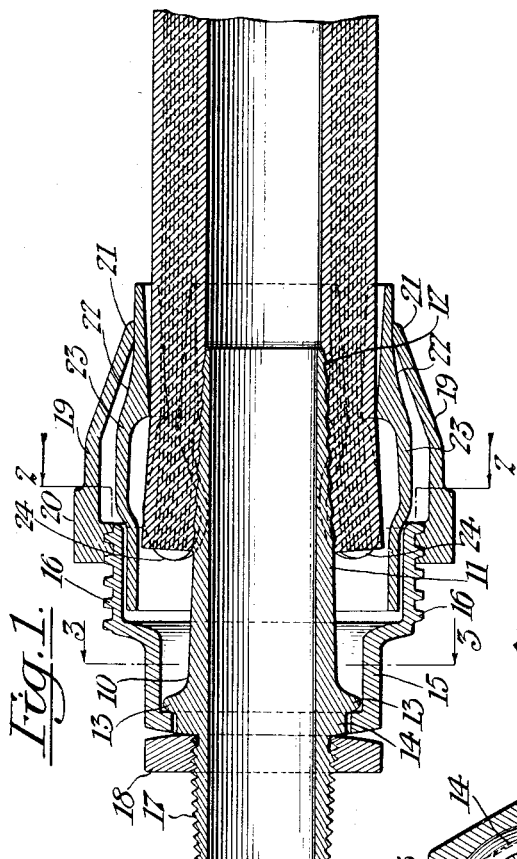
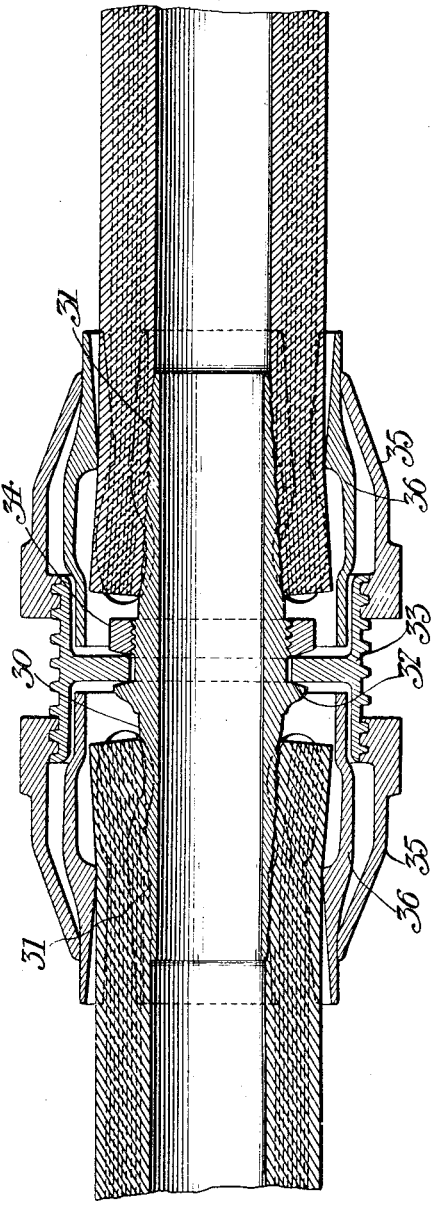
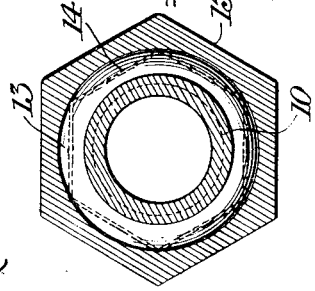
WITNESSES
INVENTOR
Charles H. Lambkin
BY
George F. Scull
His ATTORNEY

UNITED STATES PATENT OFFICE.

CHARLES H. LAMBKIN, OF NEW YORK, N. Y.

HOSE-COUPLING.

1,181,676.  Specification of Letters Patent.  Patented May 2, 1916.

Application filed November 27, 1914. Serial No. 874,164.

*To all whom it may concern:*

Be it known that I, CHARLES H. LAMBKIN, a citizen of the United States, residing at New York city, in the county of New York, State of New York, have invented certain new and useful Improvements in Hose-Couplings; and I do declare the following to be a full, true, and exact description of the said invention, such as will enable others skilled in the art to which it appertains to make use of the same.

The present invention provides a coupling designed for hose which must meet heavy pressures, the intent being to secure a tight joint between a heavy hose and a coupling member or between two sections of heavy hose.

The invention contemplates means for carrying out the foregoing purposes in a simple and efficient manner, and particularly in connection with hose which may be considerably eccentric as to its bore, and also means for giving considerable adjustability so that hose with considerable variation of thickness of wall may be accommodated.

With these and other objects in view, my invention consists of certain novel features of combination, construction and arrangement of parts as will be more fully described and pointed out in the appended claims.

In the drawings, Figure 1 represents a longitudinal section through one form of my invention; Fig. 2 represents an end section of Fig. 1 on the line 2—2; Fig. 3 represents a section of Fig. 1 on the line 3—3; Fig. 4 represents a section through another form of my invention.

The corresponding parts are referred to both in the drawings and in the specification by similar reference characters.

In the drawings 10 represents generally a main coupling member which is provided with a conical projection 11, which in some forms of my invention I preferably provide with a thread 12 by which the coupling may be screwed into the hose. The main coupling member 10 is provided with a shoulder 13. Adjacent this shoulder I provide a reduced portion 14 of any suitable shape, as hexagonal, over which is fitted a sleeve member 15 having a correspondingly shaped opening in an inwardly projecting flange thereof. This sleeve member is preferably provided with an externally threaded portion 16 and the main coupling member 10 is preferably provided with a threaded portion 17 on which is a nut 18 arranged to prevent the sleeve 15 from moving to the left of Fig. 1 on the main coupling 10. As will be shown in Fig. 1, the shoulder 13 and the nut 18 maintain the sleeve 15 in a definite relation with the main coupling 10.

In my preferred form I provide an internally threaded sleeve 19 whose threads engage with the threaded portion 16 of the sleeve 15, and is provided with any usual form such as the octagonal part 20 by which the sleeve 19 may be screwed up on the threaded portion 16. The sleeve 19 has an inwardly projecting portion 21 which bears against an externally tapered portion 22 of a slotted sleeve 23 which engages with the exterior of the hose on the tapered portion 11 of the main coupling 10. This slotted sleeve 23 is provided with a sufficient number of slots 24 extending in from its right-hand end in Fig. 1, so that the sleeve itself may be compressed radially. The sleeve 23 is freely movable longitudinally unless held by the clamping action of the sleeve 19.

In my preferred form, I make the hexagonal portion 14 of the main coupling 10 somewhat smaller than the corresponding opening in the flange of the sleeve 15. I also bevel away the shoulder 13 and the inner edge of the nut 18 so that, assuming there is no hose in the coupling, the member 15 and of course the sleeves 19 and 23 therewith, are free to be angled about the hexagon 14 and even to be moved laterally with relation thereto. When this is done, it will be seen that the sleeve 15 is no longer concentric with the main coupling 10, as it normally would be, and that the sleeve 23 will be nearer on one side than the other to the tapered portion 11 of the main coupling 10.

Assuming that the hose to be coupled has uniform thickness of walls, or in other words, that the bore is concentric with the exterior, it will be seen that it may be first screwed on the tapered portion 11, and that then the sleeve 23 may be slipped over the exterior of the hose and the sleeve 19 slipped over the sleeve 23 and engaged with the threads on the threaded portion 16. Now when the sleeve 19 is turned to screw up the threads the portion 21 thereof will slide up the externally tapered portion of the sleeve 23, thus bringing the tongues thereof inwardly to compress the hose on the tapered portion 11. This serves, of course, to make a tight joint between the hose and the coupling 10. If, as is often the case, the bore of the hose is not concentric with its exterior, the sleeve 23 will be free to adjust itself to correspond with this inequality, if the loose construction which I have previously described is provided at the hexagon 14. It will be obvious that within the limits of this joint the sleeve 23 is free to float in relation to the tapered portion 11, and since the sleeves 15 and 19 are also free to float, the coupling will adjust itself to suit the inequalities in the walls of the hose.

By making the sleeve 23 so that it is free to be moved longitudinally, it will be seen that if a hose were used, for instance, with one-half the thickness of wall of that shown in Fig. 1, the sleeve 23 may be drawn to the right until it is compressed enough to contact with this thinner wall. Thereafter, when the sleeve 19 is turned, it will serve to compress the rubber as before. In other words, by making this sleeve 23 free to be moved longitudinally, I have provided additional adjustments by which the range of the coupling is greatly increased.

In Fig. 4 I have shown a modification of the structure shown in Fig. 1 by which I am able to couple together two pieces of hose, particularly where such hose has burst. In this device, the main coupling 30 is provided with an externally tapered portion 31 at each end and a shoulder 32. An externally threaded sleeve 33 has a flange engaging with the shoulder 32 and held thereagainst by a nut 34 screwed on threads provided on the main coupling 30. Each end of this coupling is provided with sleeves 35 and slotted sleeves 36, all having the same arrangement as already described in connection with Fig. 1. The operation of this structure is similar to that in Fig. 1. Since the two ends are alike, and are connected, it is, of course, not possible for the same adjustments to take place in reference to each end. For instance, if the hose on the right had its bore concentric with its exterior and the hose on the left had its bore eccentric to its exterior, these discrepancies would not be taken up by the coupling. Since this form of coupling is intended, however, primarily to connect two ends of hose which have been cut apart, it is seen that if one of them is eccentric, the other one will be also, and that in such case the coupling will take up the eccentricities of both hoses.

It should be understood that for many purposes the loose connection which I have shown around the hexagon 14 in Fig. 1, and around the flange connecting the sleeve 33 with the coupling 30 of Fig. 4, is not absolutely required unless it is intended to provide for taking up inequalities in the walls of the hose. Consequently, the various sleeves are normally concentric with the main coupling 10, and their axes agree with the axis of that member. By providing the looseness described, however, I am enabled to have the external sleeves move so that their axes no longer coincide with the axis of the main coupling 10, and this is accomplished irrespective of whether it is done by tilting the sleeves around the hexagon 14 or by moving them bodily in any direction keeping their axes parallel to the axis of the coupling 10.

It will be understood that many variations may be made in my device without departing from my invention, and that the forms shown in the drawings are merely for purposes of illustration.

I claim:—

1. In a hose coupling, a coupling member adapted to extend into the interior of the hose, a sleeve coupling member loosely connected thereto, a radially compressible clamping sleeve surrounding the hose on said coupling member, and a clamping member engaging with said sleeve coupling member and arranged to be drawn over said clamping sleeve to compress it on the hose, said clamping sleeve being freely movable longitudinally, the connection between said sleeve coupling member and said coupling member being constructed and arranged to permit said sleeve member, sleeve and clamping member to move relatively to said coupling member to accommodate hose with an eccentric bore.

2. In a hose coupling, a double ended coupling member, each end being adapted to extend into a hose, an externally threaded sleeve fitting loosely over said coupling member and normally concentric therewith and connected thereto so as to permit its axis to be moved out of the axis of said coupling member, a pair of internally threaded sleeves with the threads thereof engaging the threads of said externally threaded sleeve and a slotted sleeve between each of said internally threaded sleeves and said coupling member, said slotted sleeves and said internally threaded sleeves being constructed and arranged to compress the hose on said coupling member when said internally threaded sleeves are screwed onto said externally threaded sleeve.

CHARLES H. LAMBKIN.

Witnesses:
W. R. WARNER,
LOUISE M. BRUNS.